United States Patent [19]

McLaughlin et al.

[11] Patent Number: 4,651,518
[45] Date of Patent: Mar. 24, 1987

[54] TRANSIENT DERIVATIVE SCHEDULING CONTROL SYSTEM

[75] Inventors: Peter W. McLaughlin, Glastonbury; Wayne R. Spock, Canton; David F. Kenison, Glastonbury, all of Conn.

[73] Assignee: United Technologies Corporation, Hartford, Conn.

[21] Appl. No.: 683,088

[22] Filed: Dec. 18, 1984

[51] Int. Cl.$^4$ ............................................. F02C 9/28
[52] U.S. Cl. ................................ 60/39.02; 60/39.161; 60/39.281
[58] Field of Search .............. 60/39.02, 39.161, 39.281

[56] References Cited

U.S. PATENT DOCUMENTS

| | | | |
|---|---|---|---|
| 4,040,250 | 8/1977 | Saunders et al. | 60/39.281 |
| 4,045,955 | 9/1977 | Brännström et al. | 60/39.161 |
| 4,104,876 | 8/1978 | Larsen et al. | 60/39.161 |
| 4,217,754 | 8/1980 | Schmidt-Roedenbeck et al. | 60/39.281 |
| 4,407,118 | 10/1983 | Burrage | 60/39.281 |
| 4,430,855 | 2/1984 | Déneux et al. | 60/39.161 |
| 4,470,118 | 9/1984 | Morrison | 60/39.281 |

Primary Examiner—Louis J. Casaregola
Attorney, Agent, or Firm—Norman Friedland

[57] ABSTRACT

By utilizing compensating parameters required for steady state operation of a gas turbine engine with processed variables of compressor speed, compressor pressure and altitude a derivative of the variable desired is synthesized and compared to the actual value in a closed-loop system for limiting the rate of change of fuel flow in an engine transient condition. In a twin spool engine a function generator responding to speed of the low pressure compressor and altitude generates a signal indicative of rate of change of the speed of the high pressure compressor. The signal is compensated for time constants consistant with the dynamics of the engine and compared with a compensated actual high pressure compressor speed. The error produced with a gain generated from corrected high pressure compressor speed inputs the main electronic digital fuel control.

8 Claims, 1 Drawing Figure

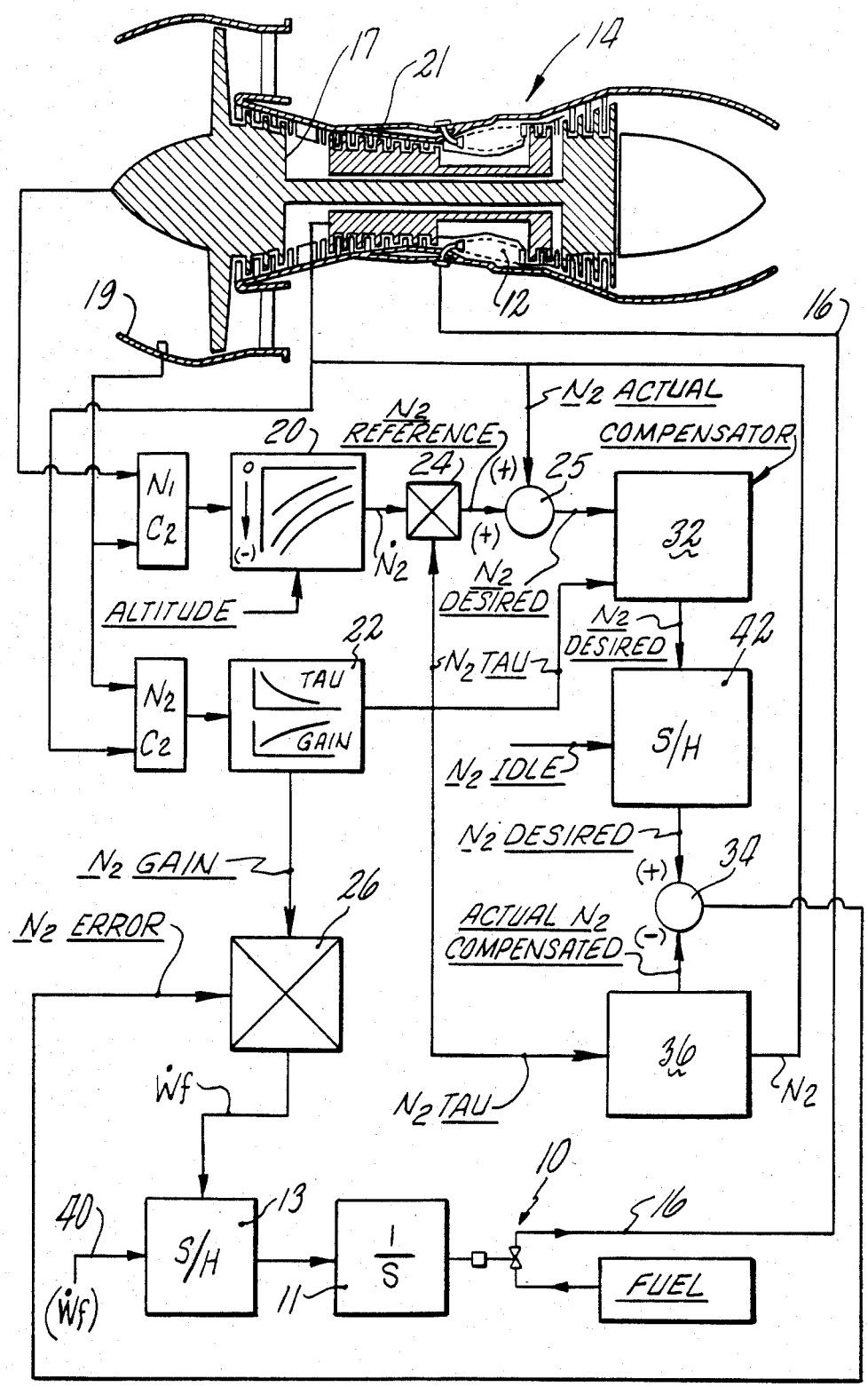

TRANSIENT DERIVATIVE SCHEDULING CONTROL SYSTEM

DESCRIPTION

1. Technical Field

This invention relates to fuel controls for gas turbine engines and more particularly to a control loop of an electronic control.

2. Background Art

As is well known, the fuel control of a gas turbine engine, in addition to other functions, essentially serves to meter fuel to the engine so as to achieve substantially immediate engine response and be able to accelerate to the operator's set condition as fast as possible without incurring rich or lean blowout, surge, overtemperature and the like. Likewise, the fuel control serves to decelerate the engine upon a command from the operator as quick as possible. To this end the fuel control monitors certain engine parameters and computes these values in terms that will optimize engine operation.

In recent years the fuel control has seen an evolution by replacing the hydro-mechanical computer mechanism of the fuel controls to all electronic computers. Obviously, it is desirable for quick responsiveness to measure the rate of change of a sensed parameter since the derivative signal essentially anticipates the change. However, the computation of derivatives of a sensed signal presents problems inasmuch as the unwanted noise adversely affects the accuracy of the signal. Also, the lower end of the filters may not respond fast enough to this input signal, thus affecting the derivative at the lower end. Where speed of the response is essential, the use of filters and hence derivatives are not satisfactory.

DISCLOSURE OF INVENTION

An objective of this invention is to provide for an electronic fuel control for a gas turbine engine, means for obtaining control of a parameter's derivative without the explicit computation of that derivative. The purpose of the invention is to achieve a transition from transient to steady-state as in a acceleration or deceleration mode, by the positive selection of two signals. This minimizes or eliminates the contention between transient and steadystate modes.

A control system in accordance with this invention achieves transient derivative scheduling requirements by utilizing information available from the conventional steady-state control law applied to the parameter whose derivative is to be scheduled. The control system makes use of conpensation parameters required in the steady-state control of a variable in order to synthesize a derivative based on both the sensed and compensated variable. This pseudo-derivative is compared to the value required. The difference between them multiplied by a gain factor is the derivative of the control output parameter. The integral of this signal is the control output value which is typical in full authority electronic controls and compatible with all the other inputs to the fuel metering valve.

Other features and advantages will be apparent from the specification and claims and from the accompanying drawings which illustrate an embodiment of the invention.

BRIEF DESCRIPTION OF THE DRAWING

The sole FIGURE is a block diagram schematically illustrating this invention.

BEST MODE FOR CARRYING OUT THE INVENTION

The invention in its preferred embodiment is utilized with a full authority electronic digital fuel control, as for example, the fuel control Model No. EEC-104 manufactured by the Hamilton Standard division of United Technologies Corporation as used on the PW2037 engine model as manufactured by Pratt & Whitney Aircraft of United Technologies Corporation, the assignee common to this patent application.

Suffice it to say that the powerplant is an axial flow twin spool turbofan and the fuel control serves to meter fuel to the engine to achieve power scheduling automatically in response to the operator's power settings.

The fuel valve 10 and its components include suitable integrator 11 that receives a plurality of inputs indicative of power setting, surge limiting, temperature limiting, minimum burner pressure and the like as expressed in terms of rate of change of fuel flow (Wf). A suitable gate or selector 13 serves to select the highest of these Wf values to set the rate of change of the fuel metering device so as to meter fuel to the engine in the proper amounts. Fuel from the metering valve 10 is admitted to the burner 12 of the engine 14 via connecting line 16 for optimum engine operation.

According to this invention the transition condition, as for example, the deceleration to a steady-state engine operating condition is controlled to assure that the engine doesn't encounter rich or lean blowout, while achieving the transition as quick as possible and maintain control stability. Obviously, the best known manner of achieving a stable transient signal in a digital control is to generate a signal in response to a process measurement such as speed or pressure, for example, to be used by a controller incorporating a derivative control action to exercise control over the process in response to the measured process parameter. The advantage of derivative of a time-based function which is defined as the rate of change of the function is well known and serves to speed up the response or control action of a control loop or system. However, because of the difficulty of achieving a derivative signal because of the spurious noise in this particular environment, this invention manifests a pseudo-like derivative signal without computing the same.

As noted in the sole FIGURE, and in the preferred embodiment the system senses the RPM of the low pressure compressor 17 and the temperature at the inlet 19 of the engine and in a suitable manner computes a corrected compressor speed signal that is applied to the function generator 20. Inputted in this function generator is an altitude signal, indicative of the altitude of the aircraft being powered by the engine, biasing the corrected compressor speed signal. The output of the function generator is a signal indicative of the rate of change of speed of the high pressure compressor ($N_2$).

Function generator 22 responds to corrected high pressure compressor speed signal arrived at by measuring the RPM of the high pressure compressor 21 and the temperature at inlet 19 generates a time responsive signal that is applied to the multiplier 24 and a gain signal that is applied to multiplier 26. The multiplicand of the multiplier 24 is indicative of a referenced high compressor speed ($N_2$).

The reference $N_2$ signal is then added in the summer 25 with actual high compressor speed ($N_2$) which signal is further processed by a compensation network that imposes a lead value indicative of the engine's characteristics so as to incorporate a stability in the control loop. The output from the compensator 32 is the desired $N_2$ signal that is applied to the summer 34.

As noted, the time responsive signal generated by function generator 22 is applied to the compensation circuits 32 and 36. This compensates the actual $N_2$ signal for the characteristics of the particular engine and the summer 34 compares the values of the compensated desired $N_2$ and the compensated actual $N_2$ signal which produces an error signal applied to the integrator network of the fuel valve 10. The gain calculated by the function generator 22 is imposed on the $N_2$ error signal in the multiplier 26 before being applied to the fuel valve.

As noted, the signal applied to the fuel control is a rate of change of fuel flow signal. Other control loops of the fuel control system apply computed Wf signal to the high select gate 13 as schematically shown via line 40 which processes these signals to input the metering valve.

The system may incorporate an override to render the deceleration mode computed signal inoperative by use of the higher select gate 42. The gate serves to output the higher of the $N_2$ desired signal or the engine idle condition mode $N_2$ signal.

It should be understood that the invention is not limited to the particular embodiments shown and described herein, but that various changes and modifications may be made without departing from the spirit and scope of this novel concept as defined by the following claims.

We claim:

1. The method of controlling a gas turbine engine of the type having a high pressure compressor, a low pressure compressor, a burner, a source of fuel, and a fuel regulator regulating the flow of fuel from said source to said burner, electronically controlling said fuel regulator in response to engine operating conditions for controlling the operation of said engine, limiting the rate of change of said regulator for transient conditions of said engine operations by simulating the derivative value of the high pressure compressor, including:

calculating the simulated derivative signal by:

(a) computing the corrected low and high pressure compressor speeds;

(b) generating an output signal that is a function of the corrected low pressure compressor speed and altitude to a value indicative of the rate of change of the high pressure compresser speed;

(c) generating a time constant signal that is a function of corrected high pressure compressor speed;

(d) multiplying the rate of change of the high pressure compressor speed signal by said time constant signal to obtain a referenced high pressure compressor speed signal;

(e) summing the referenced high pressure compressor speed signal and the actual high pressure compressor speed to obtain a first desired high pressure compressor speed signal;

(f) generating an output signal as a function of the first desired high pressure compressor speed that is indicative of a second desired rotational speed of the high pressure compressor; and (g) computing an error between the second desired rotational speed of the high pressure compressor and the actual speed of the high pressure compressor after both being compensated for the time constant determined by the dynamics of the engine.

2. The method as in claim 1 including the step of multiplying the value obtained in the last step by a gain value obtained as a function of corrected high pressure compressor speed.

3. The method as in claim 2 including the further step of selecting the high value of the idle operating speed of said high pressure compressor or the desired high pressure compressor speed.

4. The method as in claim 3 including the further step of selecting the higher of the value of the error obtained in step (2) and the other inputs to said electronic fuel regulator for controlling said electronic fuel regulator.

5. For a gas turbine engine having high pressure compressor, a low pressure compressor and a burner, a source of fuel, means for regulating the flow of fuel from said source to said burner, electronic control means for controlling said regulating means in response to engine operating conditions for controlling the operation of said engine, means for limiting the rate of said regulating means for transient conditions of said engine operations including means for simulating the derivative value of the high pressure compressor, said simulating means including:

means for sensing the speed of the low pressure compressor for generating a first signal;

means for sensing the temperature at the inlet of said engine for generating a second signal;

means for combining said first signal and second signal for producing a third signal indicative of the corrected speed of said low pressure compressor;

means for sensing the altitude of said engine for producing a fourth signal;

means for sensing the high pressure compressor speed for producing a fifth signal;

means for combining said fifth and second signal for producing a sixth signal indicative of corrected high pressure speed;

a first function generator means responsive to said third signal and fourth signal for generating a signal indicative of the rate of change of said high pressure compressor;

a second function generator means responsive to said sixth signal for generating a time constant for the high pressure compressor speed;

multiplying means for combining the output of said first function generator and said second function generator;

a first summer means for adding said fifth signal to the output of said multiplying means;

a first compensator responding to the summer means and the second function generator means for producing a signal indicative of desired high pressure compressor speed;

a second compensator responding to said second function generator and said fifth signal for producing a compensated actual high pressure compressor speed;

a second summer means responsive to said first compensator means and said second compensator means for producing an error signal for controlling said electronic control means.

6. For a gas turbine engine as in claim 5 including means responsive to said second function generator for applying a gain to said error signal.

7. For a gas turbine engine as in claim 6 including means responsive to the idle condition of said gas turbine engine for limiting the output of said first compensator.

8. For a gas turbine engine as in claim 7 including selector means for selecting the higher value of said engine operating conditions or said error signal.

* * * * *